(12) United States Patent
Miyamoto et al.

(10) Patent No.: US 7,443,842 B2
(45) Date of Patent: Oct. 28, 2008

(54) COMMUNICATION CONTROL APPARATUS

(75) Inventors: Takashi Miyamoto, Yokohama (JP);
Satoshi Kiyoto, Fujisawa (JP);
Kazuyoshi Hoshino, Komae (JP);
Kazuma Yumoto, Fuchuu (JP)

(73) Assignee: Hitachi, Ltd., Tokyo (JP)

( * ) Notice: Subject to any disclaimer, the term of this patent is extended or adjusted under 35 U.S.C. 154(b) by 516 days.

(21) Appl. No.: 10/975,493

(22) Filed: Oct. 29, 2004

(65) Prior Publication Data
US 2005/0111450 A1 May 26, 2005

(30) Foreign Application Priority Data
Oct. 31, 2003 (JP) ............... 2003-373007

(51) Int. Cl.
*H04L 12/56* (2006.01)
(52) U.S. Cl. ...................... 370/356; 370/389
(58) Field of Classification Search ........... 370/401, 370/402, 389, 356, 392
See application file for complete search history.

(56) References Cited

U.S. PATENT DOCUMENTS

| | | | |
|---|---|---|---|
| 6,856,676 B1 * | 2/2005 | Pirot et al. | 379/201.01 |
| 7,002,924 B2 * | 2/2006 | Braun et al. | 370/254 |
| 7,099,319 B2 * | 8/2006 | Boden et al. | 370/389 |
| 7,224,687 B2 * | 5/2007 | Shah et al. | 370/352 |
| 7,272,148 B2 * | 9/2007 | Zhang et al. | 370/401 |
| 2003/0072301 A1 * | 4/2003 | Ko | 370/352 |
| 2003/0097447 A1 * | 5/2003 | Johnston | 709/227 |
| 2003/0235182 A1 * | 12/2003 | McMullin | 370/352 |
| 2004/0125794 A1 * | 7/2004 | Marquette et al. | 370/355 |
| 2004/0156391 A1 * | 8/2004 | Bushnell | 370/468 |
| 2005/0058269 A1 * | 3/2005 | Watts et al. | 379/211.02 |
| 2005/0068942 A1 * | 3/2005 | Chu et al. | 370/352 |

FOREIGN PATENT DOCUMENTS

JP          09-081484          3/1997

OTHER PUBLICATIONS

Nikkei Communications Aug. 11, 2003 No. 396 pp. 76-85.
Nikkei Communications Aug. 25, 2003 No. 397 pp. 82-83.

* cited by examiner

*Primary Examiner*—Min Jung
(74) *Attorney, Agent, or Firm*—Antonelli, Terry, Stout & Kraus, LLP.

(57) ABSTRACT

The present invention provides a communication control apparatus for controlling incoming and outgoing telephone calls (communication) in a corporate private telephone network and among a plurality of corporate telephone networks by using the IP.

The communication control apparatus includes a plurality of interfaces connected to the plurality of corporate networks and processor, wherein when the processor receives an IP packet from a terminal that belongs to a first corporate network through any of the plurality of interfaces, the processor determines which of the corporate networks an incoming terminal for the packet belongs to based on outgoing SIP-URI and incoming SIP-URI contained in the header of the IP packet and performs necessary control so as to connect the outgoing terminal and the incoming terminal depending on each of the network to which the outgoing terminal belongs and other networks.

3 Claims, 12 Drawing Sheets

FIG. 5

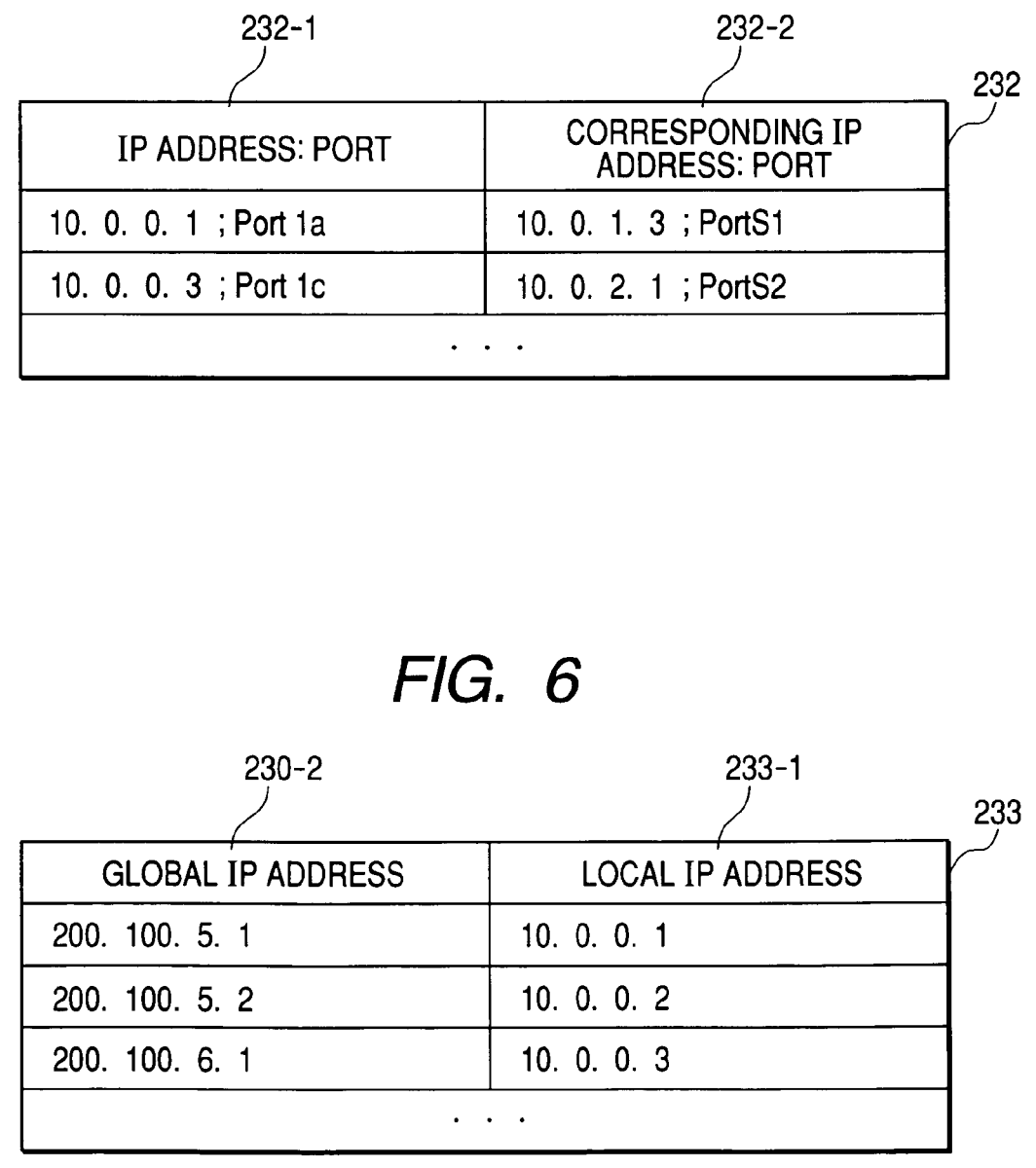

| IP ADDRESS: PORT | CORRESPONDING IP ADDRESS: PORT |
|---|---|
| 10. 0. 0. 1 ; Port 1a | 10. 0. 1. 3 ; PortS1 |
| 10. 0. 0. 3 ; Port 1c | 10. 0. 2. 1 ; PortS2 |
| . . . | |

FIG. 6

| GLOBAL IP ADDRESS | LOCAL IP ADDRESS |
|---|---|
| 200. 100. 5. 1 | 10. 0. 0. 1 |
| 200. 100. 5. 2 | 10. 0. 0. 2 |
| 200. 100. 6. 1 | 10. 0. 0. 3 |
| . . . | |

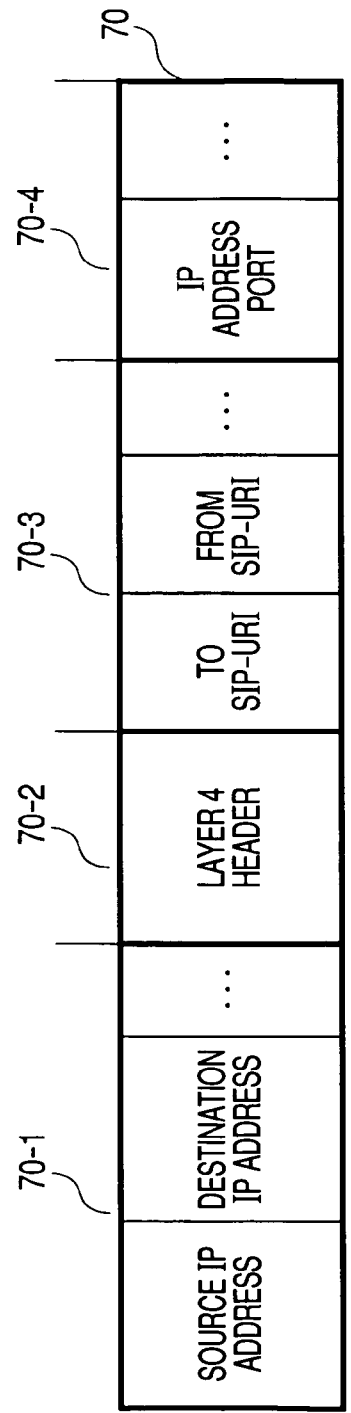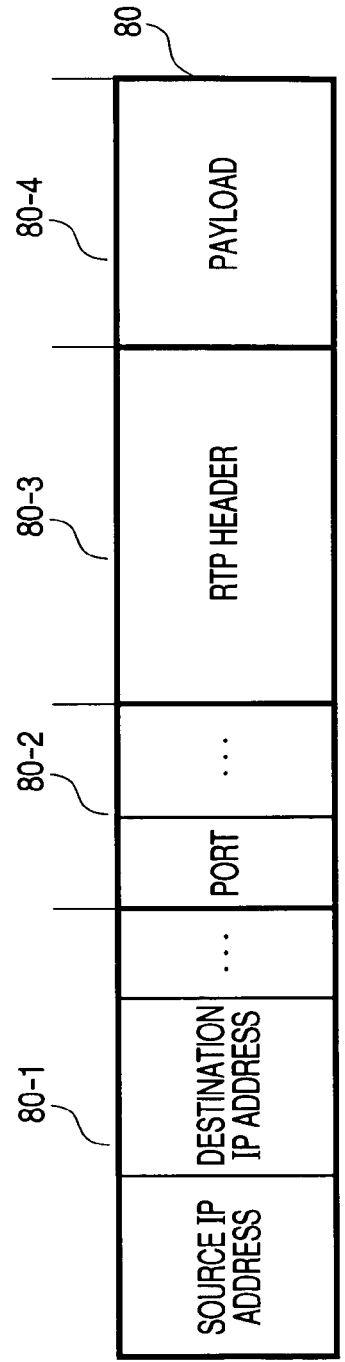

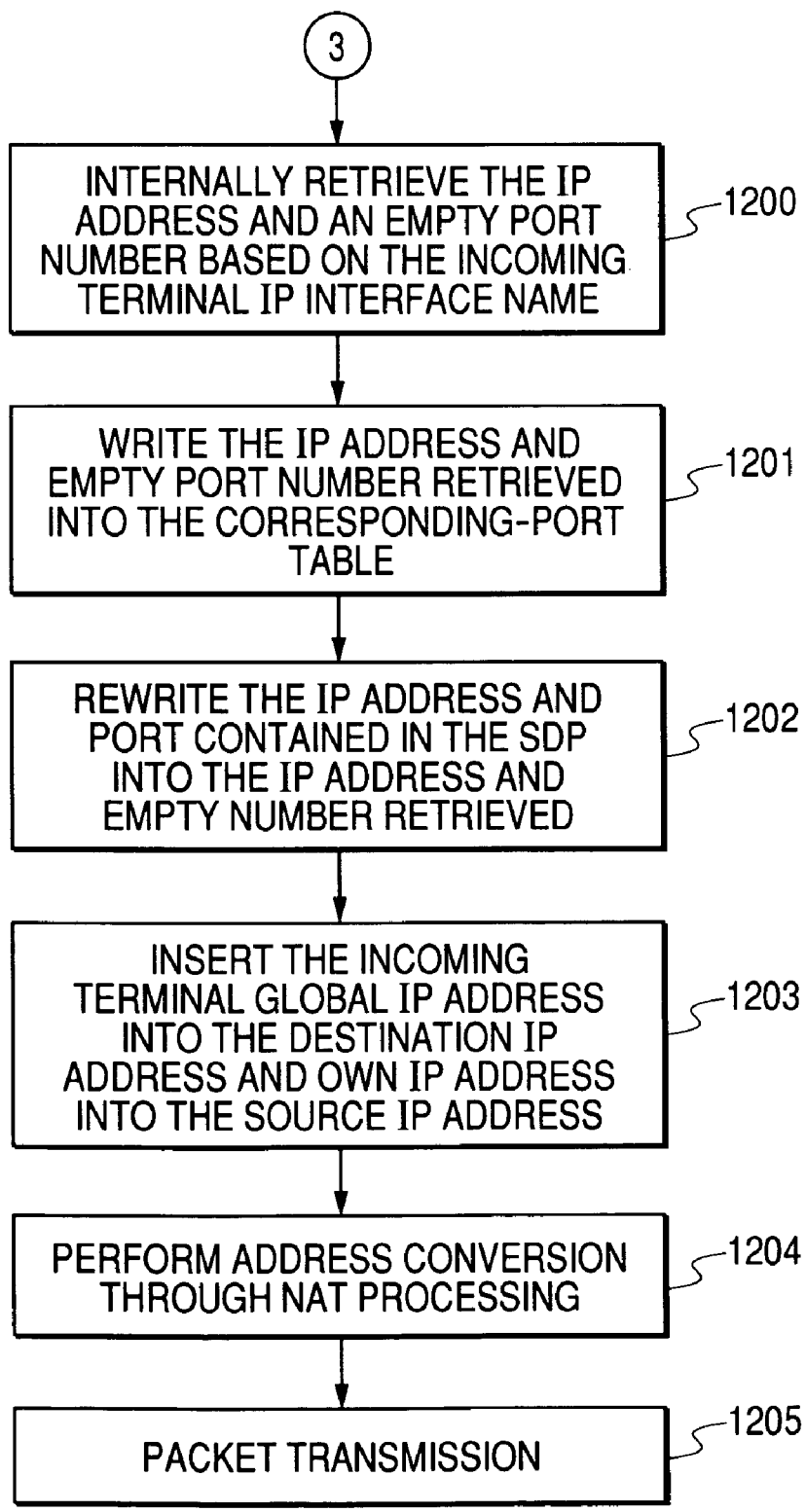

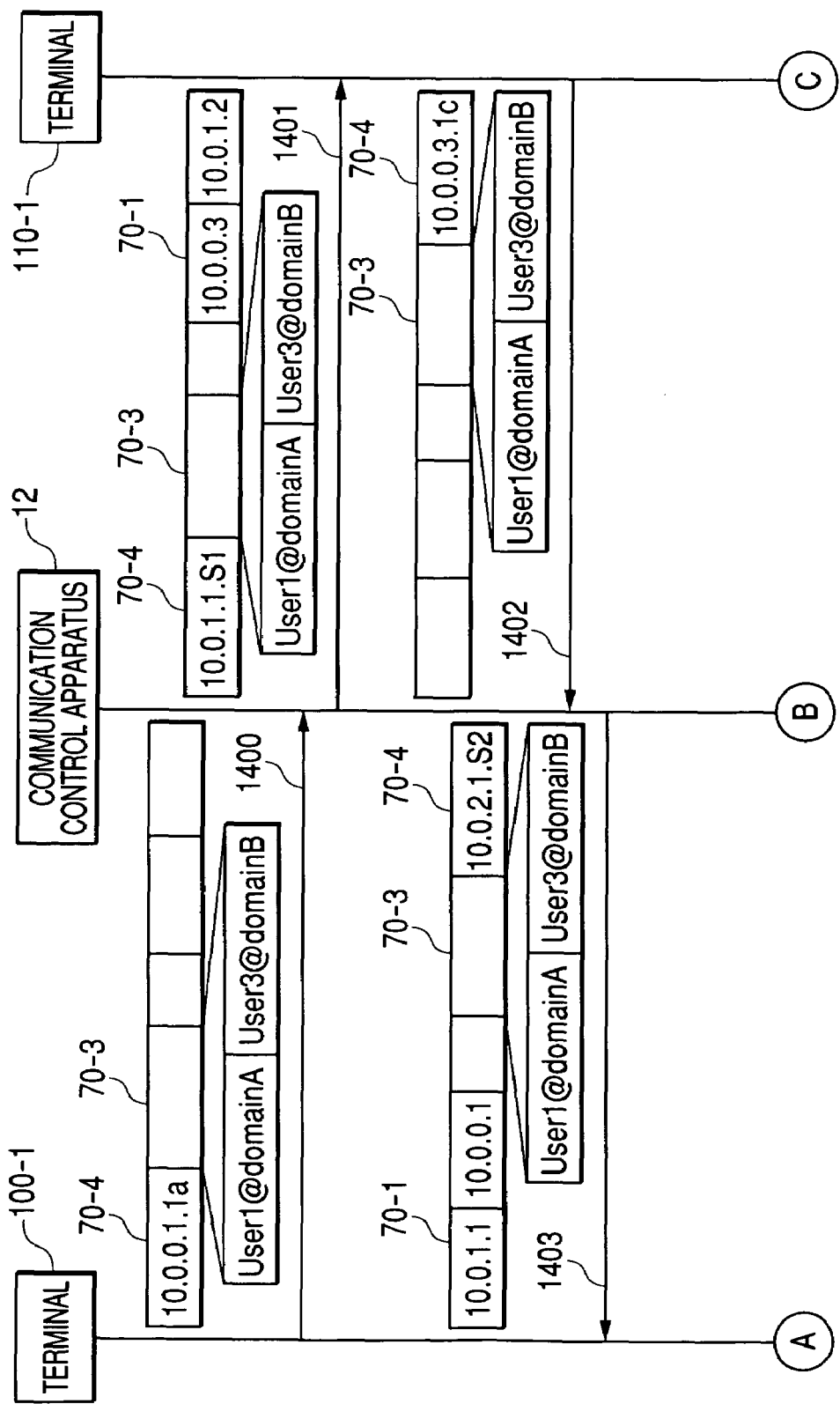

COMMUNICATION CONTROL APPARATUS

CLAIM OF PRIORITY

The present application claims priority from Japanese application serial no. 2003-3730007, filed on Oct. 31, 2003, the content of which is hereby incorporated by reference into this application.

BACKGROUND OF THE INVENTION

1. Field of the Invention

The present invention relates to a communication control apparatus for controlling incoming and outgoing telephone calls in a corporate network and between a plurality of corporate networks by using the IP (Internet Protocol).

2. Description of Related Art

Corporate communication infrastructures are being integrated based on the Internet Protocol, outsourcing of corporate equipment is becoming more and more common, and the VOIP (Voice over Internet Protocol) is gaining power. As a result, a great deal of attention is being paid to IP centrex services, services by which corporate private networks are outsourced to telecommunications carriers.

For example, a non-patent document 1 (Nikkei Communication, Aug. 11, 2003, No. 396, pp. 76-85) describes a mechanism for IP centrex services, in which an IP centrex server provides services for telephone calls such as internal calls and external calls via a corporate VPN (Virtual Private Network) built in wide Ethernet services (Ethernet is a trademark) and IP-VPN services.

Another non-patent document 2 (Nikkei Communication, Aug. 25, 2003, No. 397, pp. 82-83) discloses an example of an IP centrex telephone network with a call control server installed at only one point such as a central point in a corporate network, for controlling incoming and outgoing telephone calls among business hubs.

SUMMARY OF THE INVENTION

However, the above documents do not describe a concrete means for controlling incoming and outgoing telephone calls in a corporate private telephone network by using the Internet Protocol.

Recently there have-been more and more cases of joint product developments and joint businesses between and among companies. Therefore, a mechanism for controlling incoming and outgoing telephone calls by using the Internet Protocol will be necessary among a plurality of corporate telephone networks from now on. However, none of the above documents describe a concrete means for providing that mechanism.

The present invention provides a communication control apparatus for controlling incoming and outgoing telephone calls (communication) in a corporate extension network by using the Internet Protocol.

The present invention also provides a communication control apparatus for controlling incoming and outgoing telephone calls (communication) among a plurality of corporate telephone networks by using the Internet Protocol.

BRIEF DESCRIPTION OF THE SEVERAL VIEWS OF DRAWING

FIG. 5 is a diagram showing the configuration of a port management table 232;

FIG. 6 is a diagram showing the configuration of a NAT table 233;

FIG. 7 is a diagram showing the configuration of a call signal packet;

FIG. 8 is a diagram showing the configuration of a voice signal packet;

Figure 11B:
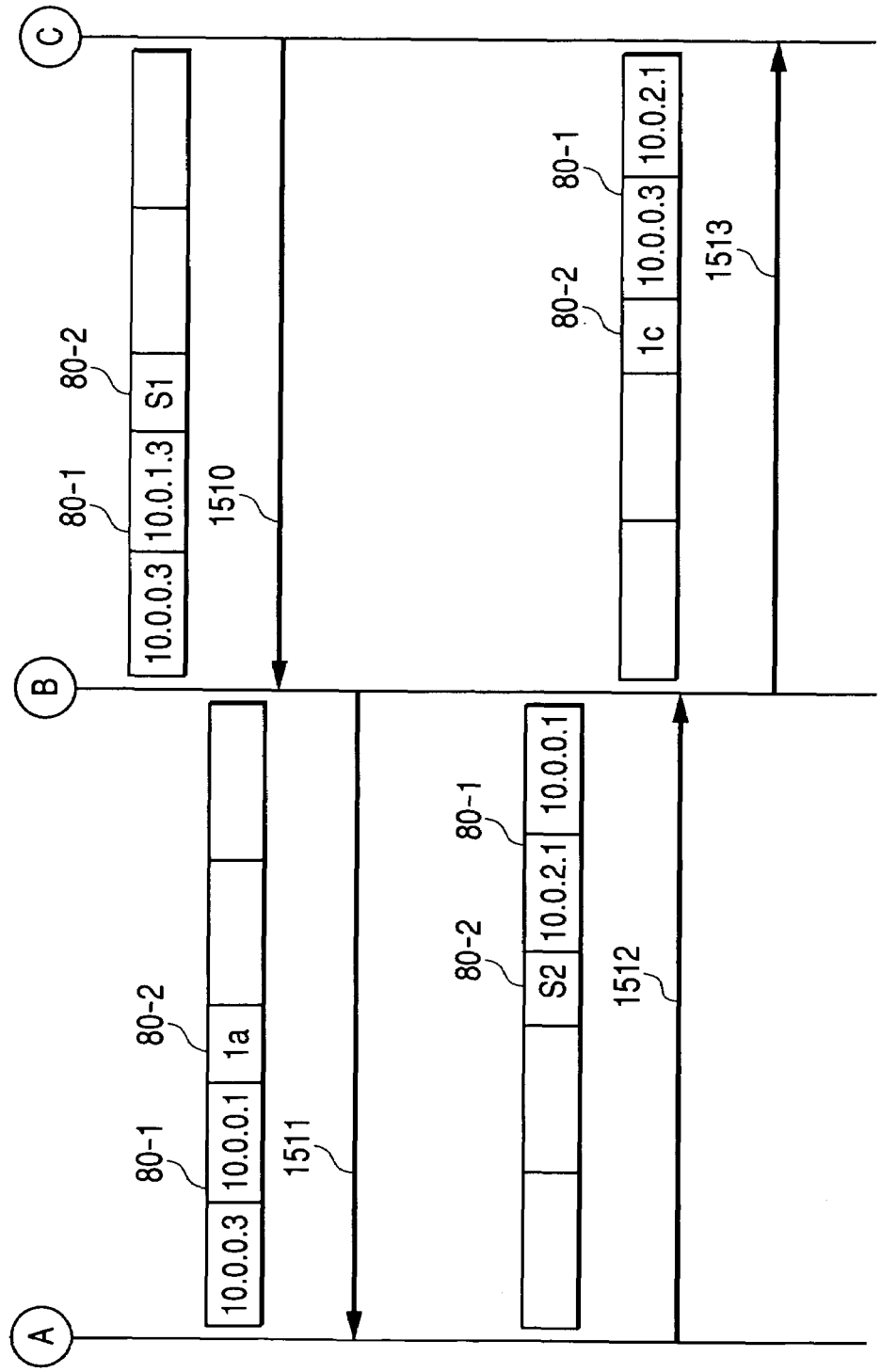
Figure 12:
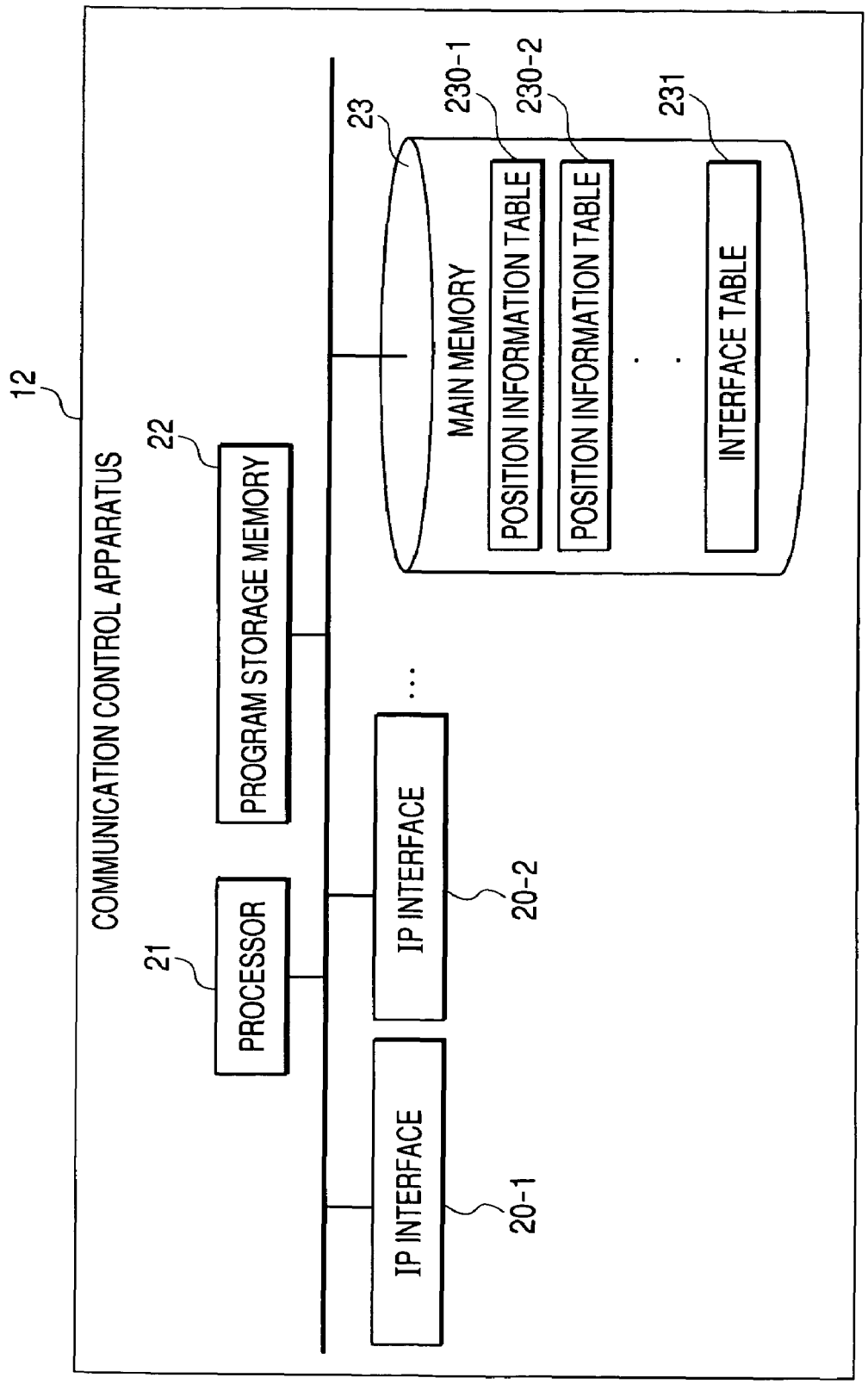

FIG. 11 is a diagram showing the transition of a call signal packet 70 and a voice signal packet 80 during communication control processing; and FIG. 12 is a block diagram showing the configuration of a communication control apparatus 12 according to a second embodiment of the present invention.

DETAILED DESCRIPTION OF THE INVENTION

Embodiments of the present invention will be described below with reference to the drawings. The embodiments described below assume IP centrex services in which a corporate telephone network (hereinafter referred to as a "corporate network") is outsourced to a telecommunication carrier for IP centrex services. These embodiments provide internal voice communication in a corporate network and external voice communication among a plurality of corporate networks by using one communication control apparatus.

FIRST EMBODIMENT

Figure 1:
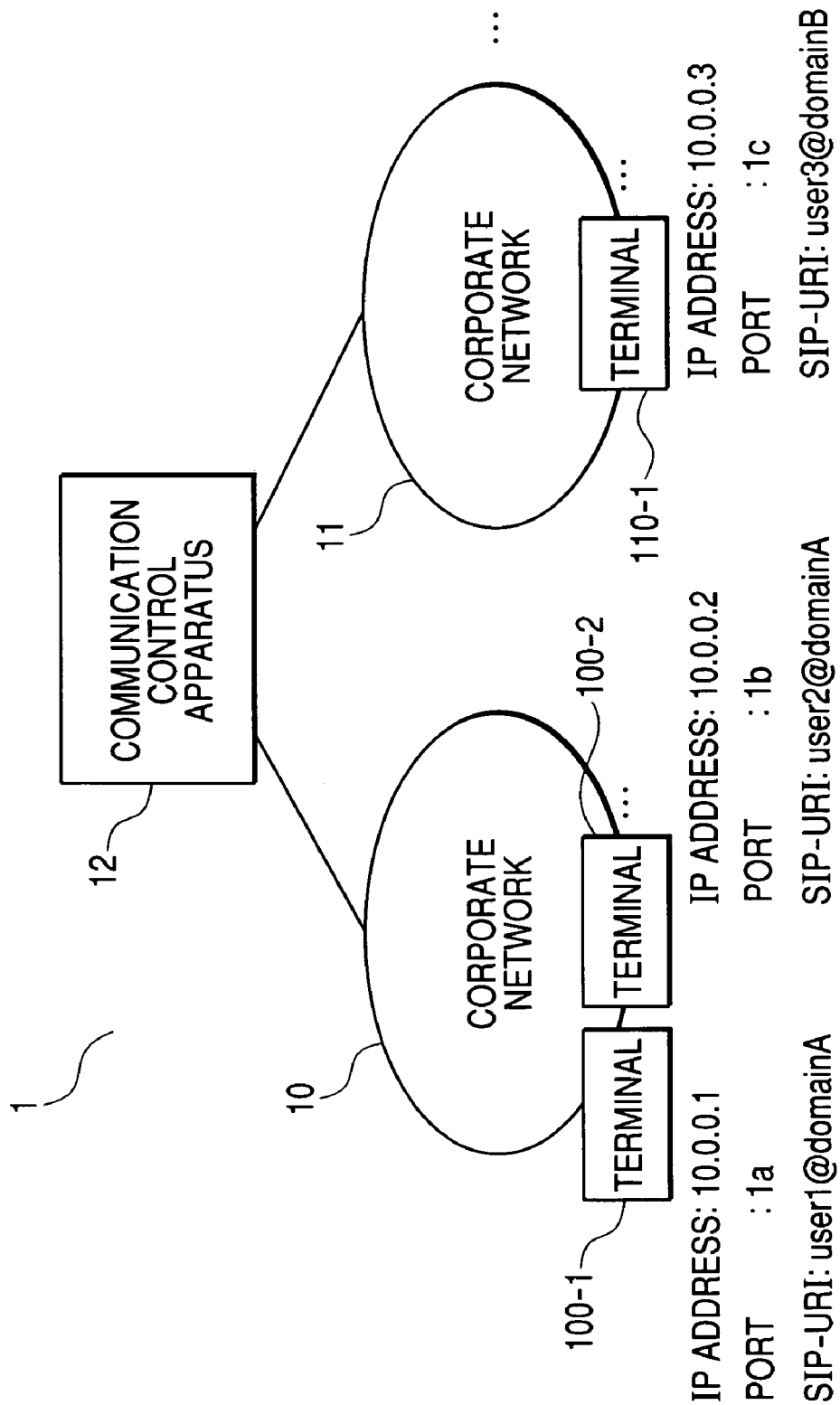
FIG. 1 is a diagram showing the configuration of an entire communication system 1 for performing incoming and outgoing telephone call control (communication) in a corporate network and among corporate networks.

FIG. 1 is a diagram showing the configuration of an entire communication system 1 for performing incoming and outgoing telephone call control (communication) in a corporate network and among corporate networks. The communication system 1 is composed of a plurality of corporate networks (IP networks) 10, 11, . . . and a communication control apparatus 12 connected to the plurality of corporate networks for controlling incoming and outgoing telephone calls in a corporate network and among corporate networks. Each of the corporate networks 10 has connected terminals (for example, IP telephones) 100-1, 100-2, . . . having local IP addresses and ports, each converting call signals and voice signals into IP packets for transmitting to the communication control apparatus 12. Similarly, the corporate network 11 has terminals 110-1, . . . connected.

In the first embodiment, the SIP (Session Initiation Protocol) is used to control calls among terminals while the RTP (Real Time transport Protocol) is used to receive and transmit voice signals among individual terminals. If each terminal 100, 110 transmits a call to an incoming terminal, as described later in detail, the terminal assigns to a call signal packet an identifier (SIP-URI (Uniform Resource Identifier)) for identifying which corporate network (domain) each of an own terminal (outgoing terminal) and the incoming terminal belongs to. The terminal then transmits the packet to the communication control apparatus 12. The communication control apparatus 12 then uses the SIP-URI for the incoming and outgoing terminals assigned to the packet received to determine whether the packet received is for internal communication or for external communication. The communication control apparatus 12 then performs communication control accordingly, thereby allowing communication in a corporate network and among corporate networks. Note that in the first embodiment "username@domainname" is designated as the SIP-URI, as shown in FIG. 1.

Figure 2:
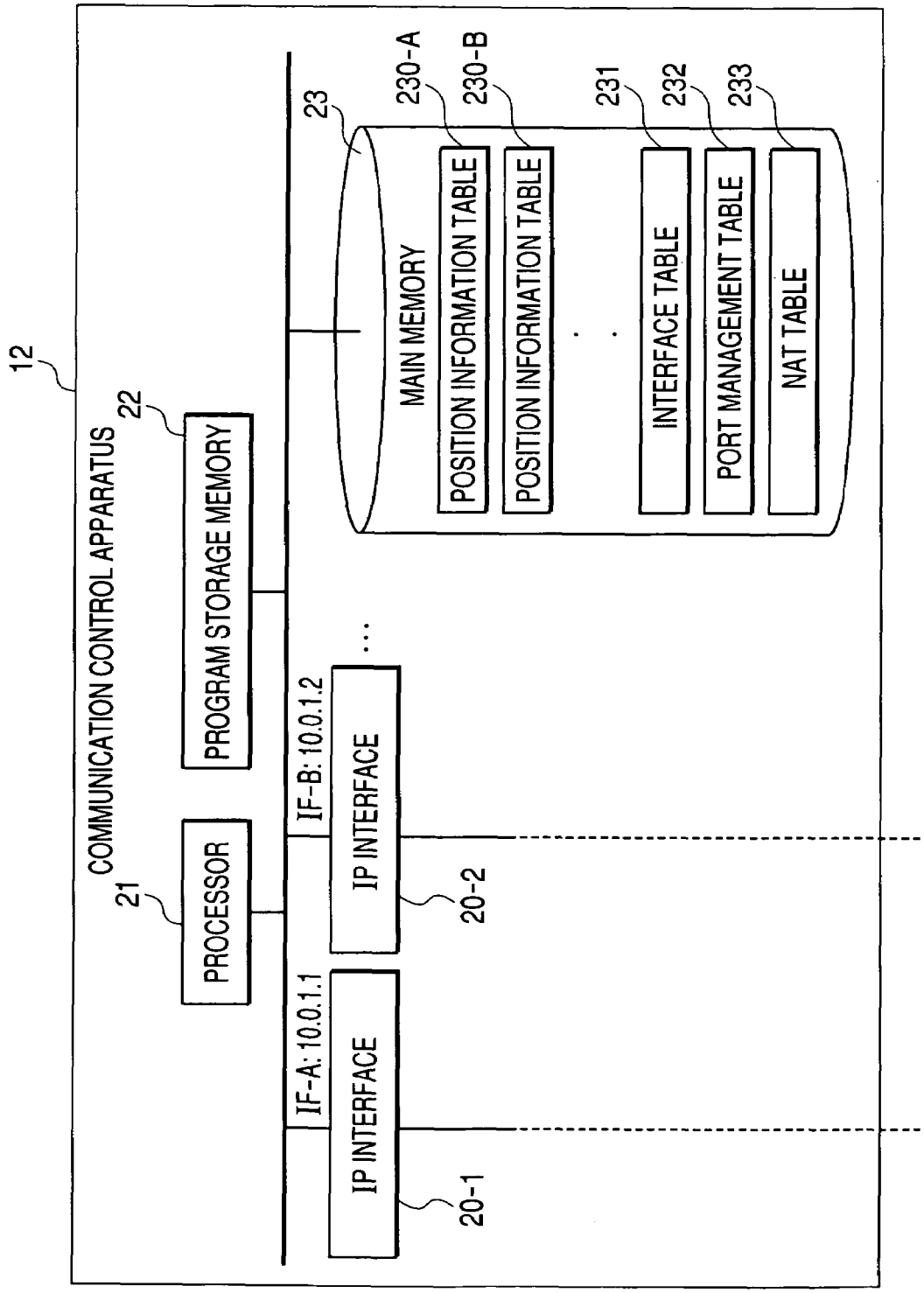
FIG. 2 is a block diagram showing the configuration of a communication control apparatus 12 according to a first embodiment of the present invention.

FIG. 2 is a block diagram showing the configuration of a communication control apparatus 12. The communication control apparatus 12 has a plurality of IP interfaces 20-1, 20-2, . . . for receiving and transmitting a packet from and to each of a plurality of corporate networks 10, 11, . . . , a processor 21 according to the present embodiment for performing communication control, a program storage memory 22 for storing programs for the communication control executed by the processor 21, and a main memory 23 for storing various tables 230-1, 230-2, . . . , 231, 232, 233, necessary for the communication control. Each IP interface 20 is provided with an interface name (for example, IF-A, IF-B) and an IP address for identification. Various tables necessary for communication control according to the present embodiment will then be described below.

Figure 3:
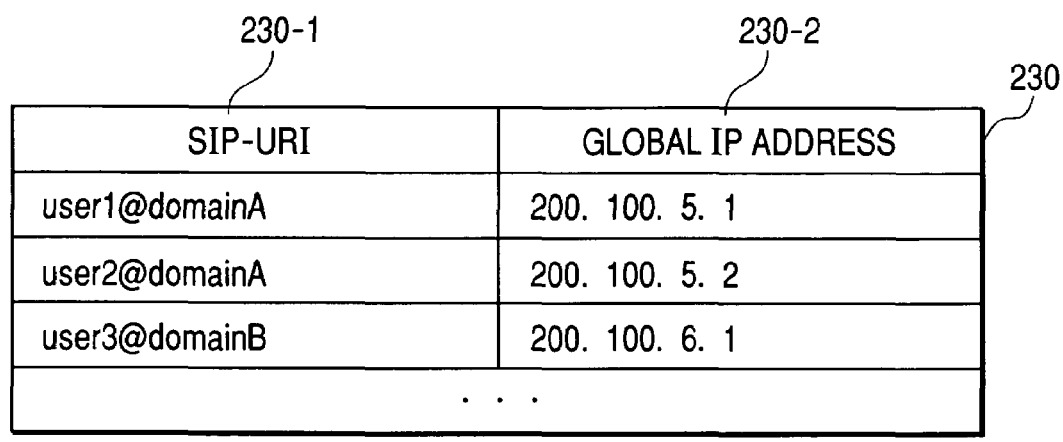
FIG. 3 is a diagram showing the configuration of a position information table 230.

FIG. 3 is a diagram showing the configuration of a position information table 230. It is thought that a same local IP address is repeated among individual corporate networks because local IP addresses are given to terminals in each corporate network. In the first embodiment, the global IP address 230-2 used only inside the communication control apparatus 12 is thus made to correspond to the above-mentioned SIP-URI 230-1 before storage in the position information table 230 such that the communication control apparatus 12 can identify each terminal properly even in the presence of any redundant local IP address among individual corporate networks. The communication control apparatus 12 according to present invention is provided with a plurality of position information tables 230 (230-A, 230-B, . . . in FIG. 2) to allow for a plurality of corporate networks 10, 11, . . . .

Figure 4:
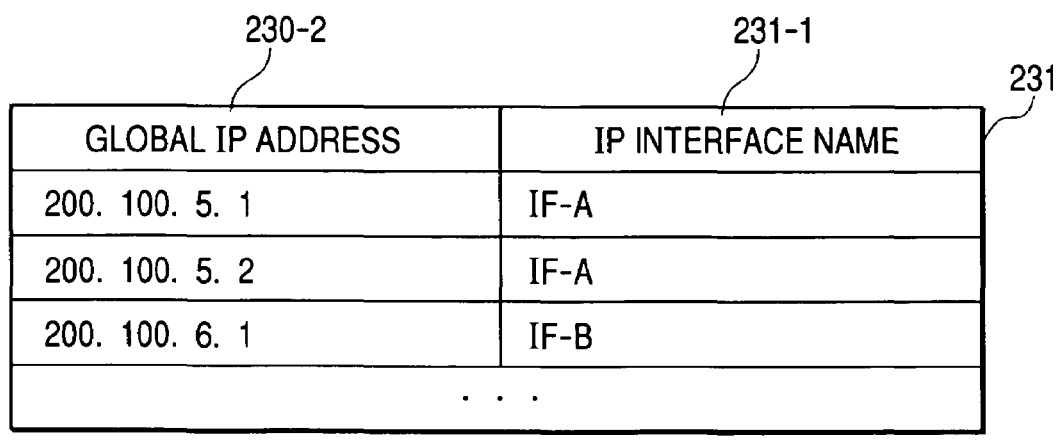
FIG. 4 is a diagram showing the configuration of an interface table 231.

FIG. 4 is a diagram showing the configuration of an interface table 231. For external communication, it is necessary to identify an IP interface (20-1, 20-2, . . . in FIG. 2) for outputting a packet because a corporate network to which an outgoing terminal belongs is different from a corporate network to which an incoming terminal belongs. In the first embodiment, an IP interface name 231-2 is thus made to correspond to the above-mentioned global IP address 230-2 before storage in the interface table 231.

The communication control apparatus 12 according to the present invention retrieves the interface table 231 based on the global IP address 230-2 and uses the interface name 231-1 thus obtained to identify the IP interface 20 to which a packet will be outputted.

FIG. 5 is a diagram showing the configuration of a port management table 232. The port management table 232 manages those IP addresses and ports used for voice communication. For external communication between terminals 100-1 and 110-1 in FIG. 1, for example, the terminal 100-1 assigns an SIP-URI for the terminal 110-1 to a call signal packet and an IP address and port for the terminal 100-1 itself to an SDP (Session Description Protocol) portion. This is done to notify the incoming terminal 110-1 of the IP address and port for the terminal 100-1 itself. As described above, however, a same IP address may be repeated for the terminals 100-1 and 110-1. If this happens, a processing procedure involved is discontinued because the terminal 110-1 looks at the IP address contained in the SDP portion of the packet received and determines that a call signal has been transmitted by a terminal having the same IP address as the terminal 110-1 itself. This therefore necessitates a processing that will allow rewriting the information in the SDP portion and using rewritten information for communication. When receiving a call signal packet, the communication control apparatus 12 according to the first embodiment therefore writes the IP address and port (the IP address and port for the terminal 100-1) assigned to the SDP portion of the call signal packet into the port management table 232. The communication control apparatus 12 then writes as a corresponding IP address and a corresponding port an IP address given to the IP interfaces 20-1, 20-2, . . . of the communication control apparatus 12 for use in call signal packet transmission as well as a port corresponding to the IP-interface IP address into the port management table 232. A search is then done for an empty port for the communication control apparatus 12, which is then determined as a corresponding port. The above procedure also applies to response to a call. Through the above processing, the terminals 100-1 and 110-1 recognize that the call signal packet has been transmitted by the communication control apparatus 12. The communication control apparatus 12 therefore receives a voice signal packet. When a voice signal packet for the terminal 110-1 is transmitted by the terminal 100-1, the communication control apparatus 12 receives the packet because of the IP address and the port assigned to the communication control apparatus 12. The communication control apparatus 12 then retrieves the port management table 232 based on the outgoing IP address and port and determines the IP address and port for the terminal 110-1 before the communication control apparatus 12 can transmit the voice signal packet to the terminal 110-1.

FIG. 6 is a diagram showing the configuration of a NAT (Network Address Translation) table 233. The NAT table 233 has a global IP address 230-2 and a local IP address (also called a private address) 233-1 that is used in a corporate network only. The global IP address is made to correspond to the local IP address before storage. In the first embodiment, the communication control apparatus 12 retrieves the NAT table 233 based on the global IP address, obtain the local IP address for an incoming terminal, and identifies the incoming terminal.

FIG. 7 is a diagram showing the configuration of a call signal packet. The call signal packet 70 consists of areas such as an IP header 70-1, a layer 4 header 70-2, an SIP header 70-3, and the SDP (Session Description Protocol) 70-4. A source IP address, a destination IP address and the like are assigned to the IP header 70-1. An IP address for an outgoing terminal, a port number and the like are assigned to the SDP 70-4.

FIG. 8 is a diagram showing the configuration of a voice signal packet. The voice signal packet 80 consists of areas such as an IP header 80-1, a layer 4 header 80-2, an RTP header 80-3 and a payload 80-4 for storing the voice signal.

Figure 9A:
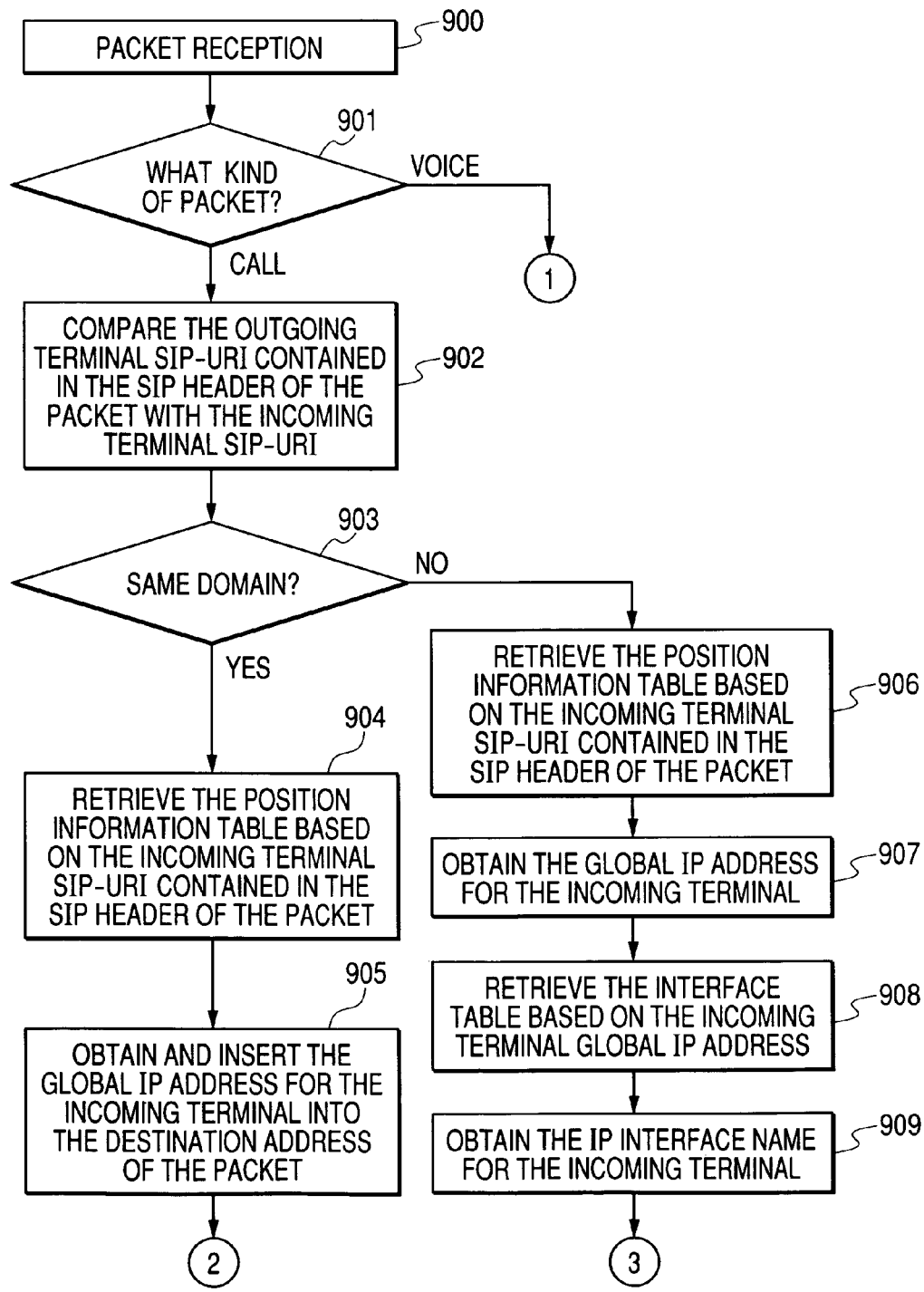
FIG. 9 is a flow chart showing the details of communication control processing in a communication control apparatus 12.
Figure 9B:
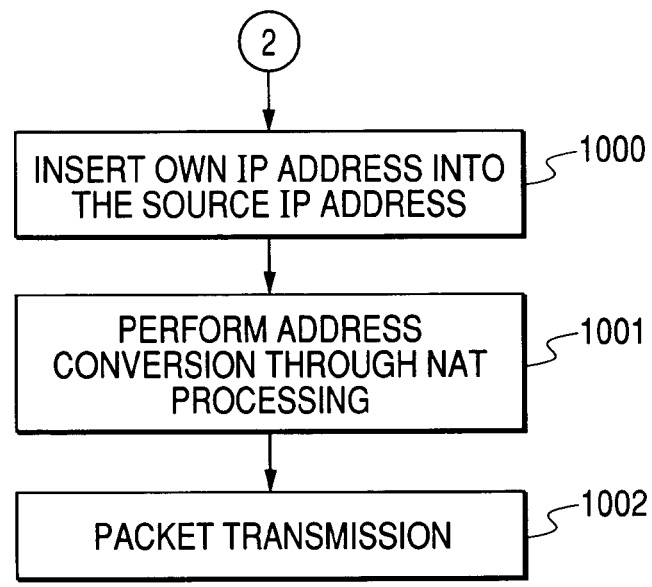
Figure 9C:
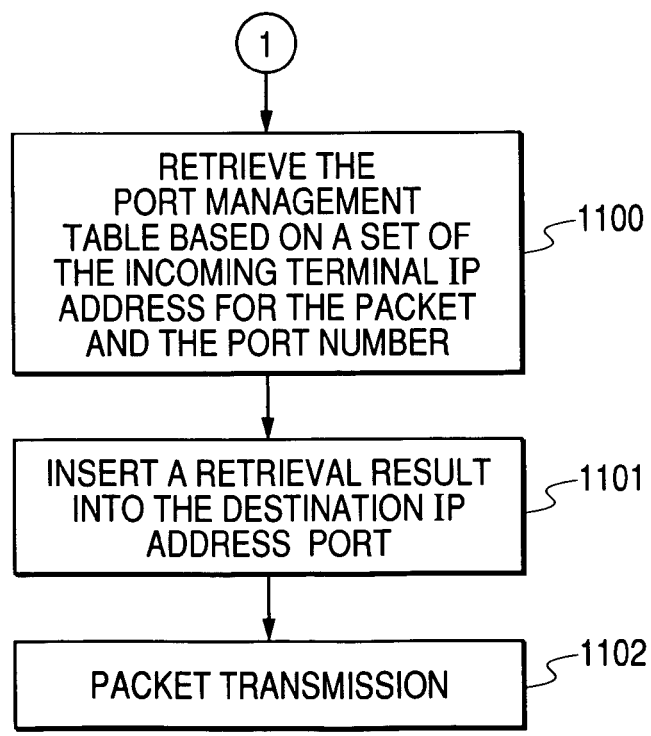
Figure 10:
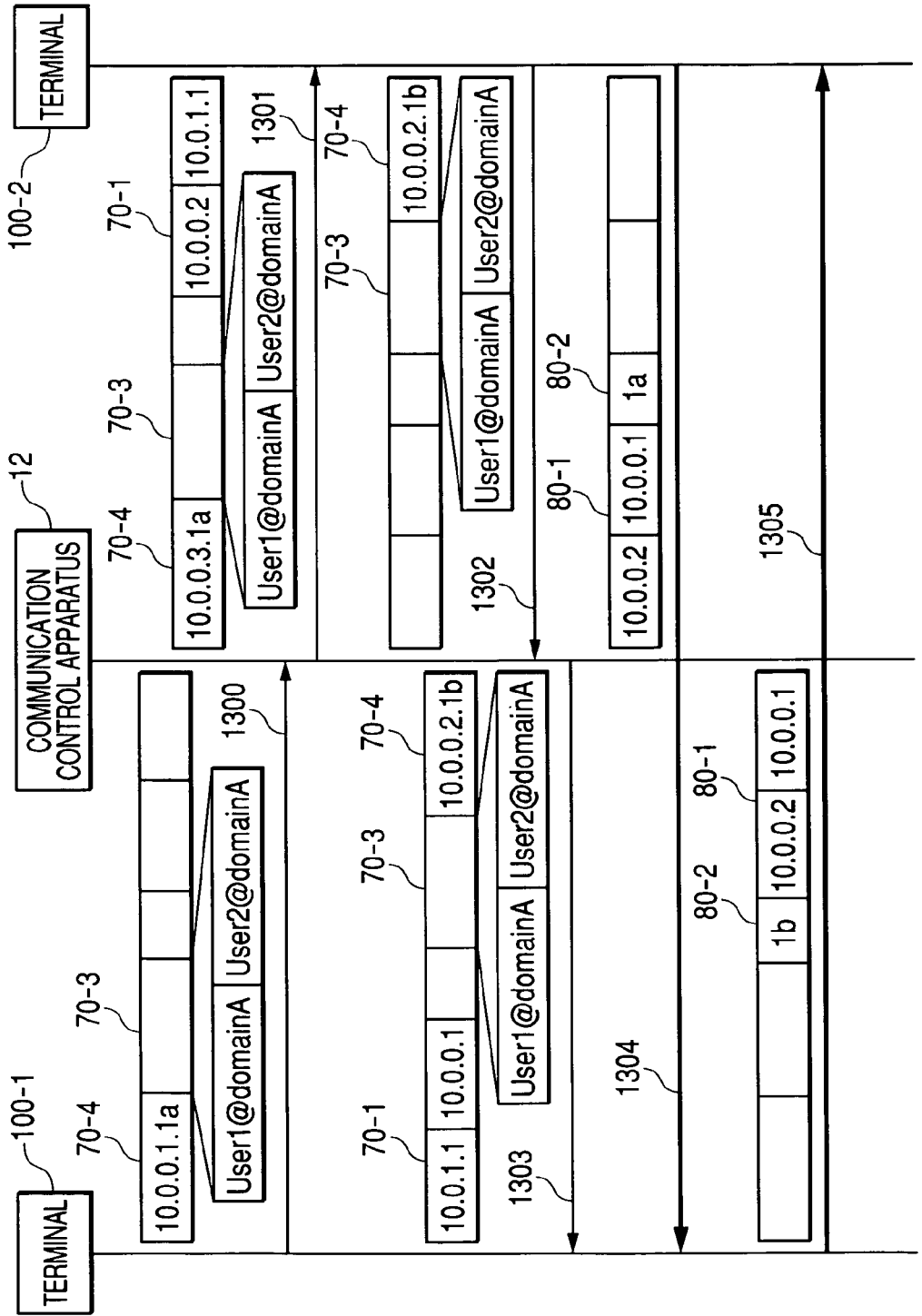
FIG. 10 is a diagram showing the transition of a call signal packet 70 and a voice signal packet 80 during communication control processing.

FIG. 9 is a flow chart showing the details of communication control processing in a communication control apparatus 12. Each of FIGS. 10 to 12 is a diagram showing the transition of a call signal packet 70 and a voice signal packet 80 during communication control processing.

(Internal Communication)

A processor 21 receives a packet from a terminal 100-1 in a corporate network 10 through an IP interface 20-1 (step 900 in FIG. 9A, 1300 in FIG. 10, 1400 in FIG. 11A) and determines the type of the packet received based on the information contained therein (step 901). After determining that the packet received is a call signal packet 70, the processor 21 compares the outgoing-terminal 100-1 SIP-URI (User1@domainA) contained in the SIP header 70-3 and the incoming-terminal SIP-URI (User2@domainA) (step 902). The processor 21 then determines whether the outgoing terminal 100-1 and the incoming terminal belong to the same corporate network (domain) (step 903). If these two terminals are in the same domain, i.e., for internal communication, the processor 21 then retrieves a corresponding position information table (230 in the first embodiment) based on the incoming-terminal (100-2 in the first embodiment) SIP-URI (User2@domainA) contained in the packet received (step 904). The processor 21 then obtains and inserts a global IP address (200.100. 5. 2) for the incoming terminal 100-2 into a destination IP address contained in an IP header 70-1 of the packet 70 received (step 905). The processor 21 then inserts an own IP address (an IP address for an IP interface 20-1 in the first embodiment: 10. 0. 1. 1) into a source IP address for an IP header 70-1 (step 1000). The processor 21 then retrieves an NAT table 233 based on the global IP address (200. 100. 5. 2) and obtains a local IP address (10. 0. 0. 2) for the incoming terminal 100-2. The processor 21 then converts the destination IP address contained in the SIP header 70-1 into the incoming-terminal 100-2 local IP address (10. 0. 0. 2) obtained (step 1001). The processor 21 then transmits the local IP address to the incoming terminal 100-2 through the IP interface 20-1 (step 1002, 1301 in FIG. 10). Response to the call by the incoming terminal is also processed in the same way as described above, so that the response is transmitted from the incoming terminal to the outgoing terminal (1302, 1303). Call control for internal communication is completed through the processing described above.

A voice signal packet is received and transmitted through peer-to-peer communication between the terminals 100-1 and 100-2 (not through the communication control apparatus 12). If a packet 80 is transmitted from the terminal 100-2 to the terminal 100-1, the source IP address and destination IP address contained in the IP header 80-1 are designated as 10. 0. 0. 2 and 10. 0. 0. 1, respectively before the packet is transmitted to the terminal 100-1 (1304 in FIG. 10). If the packet is transmitted from the terminal 100-1 to the terminal 100-2, the source IP address and destination IP address contained in the IP header 80-1 are designated as 10. 0. 0. 1 and 10. 0. 0. 2, respectively before the packet is transmitted to the terminal 100-2 (1305 in FIG. 10).

(External Communication)

If the processor 21 determines that each of the outgoing terminal and the incoming terminal belongs to a different corporate network (not the same domain) in step 903 (a domain A for the outgoing terminal 100-1 and a domain B for the incoming- terminal 110-1 in the first embodiment), the processor 21 then retrieves a corresponding position information table (230 in the first embodiments based on the incoming-terminal 110-1 SIP-URI (User3@domainB, 1400 in FIG. 11A) contained in the SIP header 70-3 (step 906). The processor then obtains an incoming-terminal global IP address (200. 100. 6. 1) (step 907). The processor 21 then retrieves an interface table 231 based on the global IP address (200. 100. 6. 1) obtained (step 908) and obtains an incoming-terminal 110-1 IP interface name (IF-B) (step 909). The processor 21 then retrieves an IP address and an empty-port number for the IP interface 20, for example, based on the IP interface name (IF-B) (step 1200), where the empty-port number refers to an processing identifier in TCP/IP communication, for example. The processor 21 then writes an own IP address (10. 0. 1. 3 in the first embodiment) found and the empty-port number (S1 in the first embodiment) into a port management table 232 (step 1201). The processor 21 then rewrites an IP address and a port number for an SDP 70-4 into the above-mentioned IP address and empty-port number (step 1202). The processor 21 then inserts a global IP address (200. 100. 6. 1) for the incoming terminal 110-1 and an own IP address (10. 0. 1. 2) into the destination-IP address and source IP address contained in the IP header 70-1, respectively (step 1203). The processor 21 then retrieves the NAT table 233 based on the above-mentioned global IP address (200. 100. 6. 1) and obtains a local IP address (10. 0. 0. 3) for the incoming terminal 110-1. The processor 21 then converts the destination IP address contained in the SIP header into the incoming-terminal 110-1 local IP address (10. 0. 0. 3) obtained (step 1204). The processor 21 then transmits the local IP address to the incoming terminal 110-1 through an IP interface 20-2 (step 1205, 1401 in FIG. 11A). Response to the call by the incoming terminal is also processed in the same way as described above for transmission to the outgoing terminal (1302, 1303). Call control for internal communication is completed through the processing described above.

The processor 21 then determines the type of the packet received based on the information contained therein at step 901 in FIG. 9A. If the packet is a voice signal packet from the terminal 110-1 (1510 in FIG. 11B), the processor 21 then retrieves the port management table 232 based on a set of the IP address (10. 0. 1. 3) and the port number (S1). (step 1100) for the packet. The processor 21 then inserts the outgoing-terminal 100-1 IP address (10. 0. 0. 1) and port (1a) thus obtained into an destination IP address contained in an IP header 80-1 of the packet 80 and a port contained in the layer 4 header 80-4 of the packet 80, respectively before transmitting the packet to the outgoing-terminal 100-1 (step 1102, 1511 in FIG. 11B). If the packet is a voice signal packet from the terminal 100-1, the processor 21 then retrieves the port management table 232 based on a set of an IP address (10. 0. 2. 1) and a port number (S2) (step 1100) for the packet (step 1100). The processor 21 then inserts an outgoing-terminal 100-1 IP address (10. 0. 0. 3) and a port (1c) thus obtained into the destination IP address contained in the IP header 80-1 of the packet 80 and the port contained in the layer 4 header 80-4 of the packet 80, respectively before transmitting the packet to the outgoing-terminal 100-1 (step 1102).

SECOND EMBODIMENT

FIG. 12 is a block diagram showing the configuration of a communication control apparatus 12 under an IPv6 (Internet Protocol Version 6) network environment. In FIG. 12, the same blocks as in FIG. 2 (the first embodiment) are given the same symbols. In the second embodiment, a global IP address is given to each unit, thus preventing a problem of IP addresses repetition. This eliminates the need for the port management table 232 and the NAT table 233, which are required in the first embodiment. The processor determines if the packet received is for internal communication or external communication based on an SIP-URI contained therein and has only to perform necessary control respective to each of internal communication and external communication.

THIRD EMBODIMENT

In the embodiments described above, the description has been made of a realization means for the communication control apparatus 12 to control incoming and outgoing telephone calls in a corporate network and among corporate networks. If a unit is provided only for controlling incoming and outgoing telephone calls in only a corporate network or only among corporate networks, the apparatus 12 has only to be provided with only functions that are necessary for either intended purpose.

According to the present invention, a communication control apparatus can be provided for controlling incoming and outgoing telephone calls (communication) in a corporate private telephone network by using the IP.

According to the present invention, a communication control apparatus can also be provided for controlling incoming and outgoing telephone calls (communication) among a plurality of corporate telephone networks by using the IP.

According to the present invention, one communication control apparatus allows incoming and outgoing telephone calls to be controlled among a plurality of corporate telephone networks, thus making it possible for companies to reduce costs of their communication equipment, management costs of their communication equipment, and the like.

What is claimed is:

1. A communication control apparatus for controlling communication among a plurality of networks with a plurality of terminals connected thereto, said communication control apparatus comprising:
    a plurality of interfaces connected to said plurality of networks;
    a processor;
    a first table for making incoming SIP-URI correspond to a plurality of pieces of first incoming-terminal information for properly identifying said plurality of terminals for storage; and
    a second table for making said first incoming-terminal information correspond to a plurality of pieces of second incoming-terminal information given in advance to each of said plurality of terminals for storage;
    wherein, when said processor receives a packet from a terminal that belongs to a first network through any of said plurality of interfaces, said processor determines whether an incoming terminal for said packet belongs to said first network or a second network based on first information and second information in said packet and controls communication to connect said outgoing terminal and said incoming terminal depending on each of said first network or said second network,
    wherein said packet is an SIP (Session Initiation Protocol) packet, and said first information and said second information are an outgoing SIP-URI (Uniform Resource Identifier) and an incoming SIP-URI assigned to an SIP header in said SIP packet, respectively, and
    wherein said processor, when determining that the incoming terminal for said packet from said first network belongs to the first network, comprises:
    means for retrieving said first table based on the incoming SIP-URI in said packet and obtaining said first incoming-terminal information;
    means for retrieving said second table based on said first incoming-terminal information obtained and obtaining second incoming-terminal information for said terminal; and
    means for connecting said outgoing terminal and said incoming terminal by using said second incoming-terminal information.

2. A communication control apparatus according to claim 1, comprising:
    a third table for making said plurality of pieces of first incoming-terminal information correspond with an interface to which said packet will be outputted for storage;
    wherein, when said processor determines that an incoming terminal for said packet from said first network belongs to a second network, said processor retrieves said third table based on said first incoming-terminal information in said packet and determines an interface to which said packet received will be outputted.

3. A communication control apparatus according to claim 2, comprising:
    a fourth table for making said second address information and a port number for an outgoing terminal assigned to said packet received correspond to third address information and an empty port number for an own unit given to said plurality of interfaces for storage;
    wherein, when said processor determines that an incoming terminal for said packet from said first network belongs to a second network, said processor retrieves the third address information given to said plurality of interfaces and the empty port number in the own unit based on said second address information and port number for the packet received, assigns said third address information and said port number retrieved to said packet, and transmits said packet to the incoming communication terminal.

* * * * *